(No Model.)

J. M. THURSTON.
CENTRIFUGAL MACHINE.

No. 596,389. Patented Dec. 28, 1897.

Witnesses:
J. D. Mothershead
M. E. Pancoast

J. M. Thurston,
Inventor.
By Edson Bros.
Asso. Attys.

UNITED STATES PATENT OFFICE.

JOSEPH M. THURSTON, OF RICHMOND, INDIANA.

CENTRIFUGAL MACHINE.

SPECIFICATION forming part of Letters Patent No. 596,389, dated December 28, 1897.

Application filed April 22, 1897. Serial No. 633,335. (No model.)

*To all whom it may concern:*

Be it known that I, JOSEPH M. THURSTON, a citizen of the United States, residing at Richmond, in the county of Wayne and State of Indiana, have invented certain new and useful Improvements in Means for Preparing Liquid Pharmaceutical Preparations; and I do hereby declare the following to be a full, clear, and exact description of the invention, such as will enable others skilled in the art to which it appertains to make and use the same.

My invention is a means for preparing liquid pharmaceutical preparations; and the object that I have in view is to facilitate and cheapen the production of medicinal liquid compositions and to provide simple and efficient means whereby the medicinal properties of drugs may be quickly extracted and in which provision is made for readily interchanging one-drug receptacle for another to make the receptacles suit the nature and quantity of the drug as it is treated by the machine.

In practicing my invention I utilize the principle of centrifugal action of a liquid which is to carry the medicinal properties of the drug or drugs, according to the preparation it is desired to produce.

The invention consists in a means whereby different drug-receptacles may be used in connection with the casing and the means for rotating the drug-receptacle, which means consists of an arbor, a rotatable disk-like carrier thereon, and a receptacle-clamp mounted on said carrier and adapted to hold a receptacle rigidly, but detachably, on the carrier; and the invention further consists in the novel combination of devices and in the construction and arrangement of parts, which will be hereinafter fully described and claimed.

To enable others to understand my invention, I have illustrated the preferred embodiment thereof in the accompanying drawings, forming a part of this specification, and in which—

Figure 1:
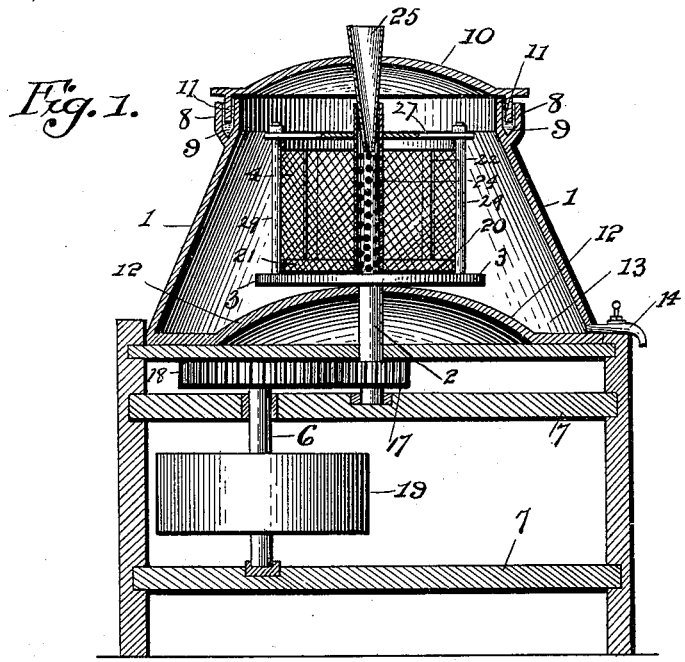
Figure 2:
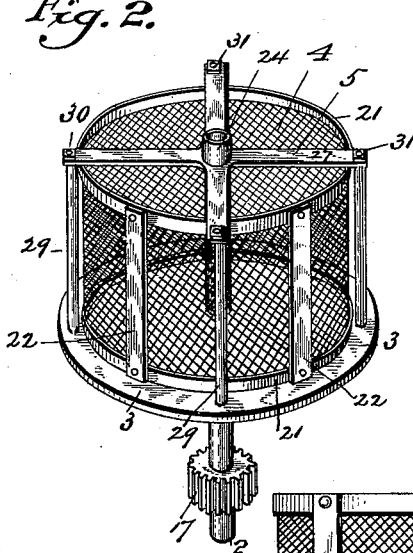
Figure 3:
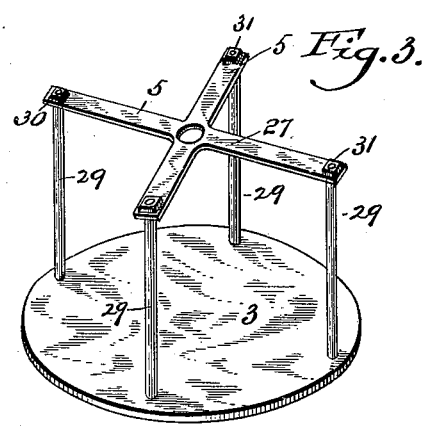
Figure 4:
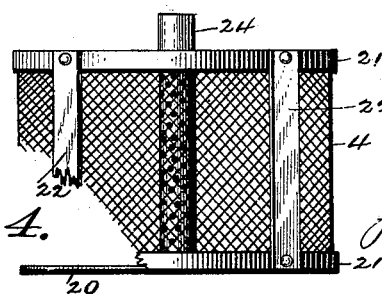

Figure 1 is a vertical sectional elevation through my machine. Fig. 2 is a detail perspective view of the rotatable carrier and drug-receptacle. Fig. 3 is a detail perspective view of the carrier with the clamp for the drug-receptacle. Fig. 4 is a detail view of one form of the drug-receptacle.

Like numerals of reference denote corresponding parts in all the figures of the drawings, referring to which—

1 designates the stationary casing or jacket, 2 is the revoluble shaft or arbor, 3 is the carrier on said shaft, 4 is the drug-receptacle, 5 is a clamp for holding the receptacle 4 rigidly on said carrier, and 6 is the driving-shaft, the whole mounted in a suitable way on a proper framing or support 7.

The casing 1 is an imperforate vessel having flared walls and an open upper end or mouth. Around this mouth is an offstanding flange 8, arranged to provide the channel 9, and said open end or mouth of the casing is adapted to be closed by a cover 10, which has a flange 11 arranged to fit in the channel 9, said channel being designed to contain a liquid, such as water, to form a liquid seal between the casing and the cover, thus reducing to a minimum the leakage of vapors and contents of the casing. The bottom of said casing is raised or made concavo-convex at its central portion, as at 12 in Fig. 1, to form, with the inclined walls of the casing, a narrow comparatively deep collecting-trough 13, into which the liquid deflected by the inclined walls of the casing is caused to accumulate, so that it may be drawn off to good advantage by and through the cock or faucet 14. Centrally through this raised central part of the bottom of the casing is an opening through which passes a vertical rotatable arbor or shaft 2, which is suitably journaled in the casing and in the framing 7, and the lower exposed end of said arbor is geared to a driving-shaft 6 through the intermeshing gears 17 18, said driving-shaft being also journaled in the framing and having a suitable belt-pulley 19 or its equivalent, whereby power may be applied to said shaft 6 to rotate the shaft 2 rapidly through the gearing. To the upper end of this shaft, which lies within the casing 1, is rigidly fastened the carrier 3, which is adapted to rotate with the shaft 2. This carrier is preferably in the form of a flat disk arranged in a horizontal position within the casing, although the form of the carrier is not essential.

The drug-receptacle 4 consists of a flat imperforate disk-like bottom 20, annular bands or rings 21, vertical bars 22, which are united to said imperforate bottom and the bands or rings, an inclosing wall 23, of wire-gauze, perforated metal, or other foraminous material, which is stretched around and united to the bands and bars, and a perforated feed-tube 24, the whole constituting a strong and substantial basket or cage-like metallic structure adapted to confine the mass of drug material within its annular boundary-wall, but open for the free percolation and escape of the liquid vehicle.

To the bottom of the cage-like receptacle and constituting a part of the receptacle is secured a vertical central tube 24, which projects upwardly through the crate or basket like receptacle 4. This tube is secured rigidly at its lower end to the disk-shaped bottom 20 of the cage-like receptacle in any suitable way so as to rotate therewith, and the tube is of such length that it will project above the receptacle 4 and extend above the mass of drug material therein, so that the drug material is not liable to lodge in said tube. In fact, the tube 24 extends well up to the cover 10, so as to receive within its open upper extremity the lower end of a feed-funnel 25, which is fitted or attached centrally to the cover 10, whereby the liquid may be conveniently supplied from time to time to the feed-tube 24. This tube 24 has a multiplicity of perforations, through which the liquid supplied thereto by the funnel may by centrifugal force by thrown and expelled from said tube laterally into and through the mass of drug material confined within said cage-like receptacle 4. This receptacle is placed centrally within the casing and its bottom rests upon the disk-like carrier 3. To prevent the cage-receptacle from shifting on said carrier and to cause it to rotate rapidly with the carrier, the shaft, and the central perforated feed-tube, I have provided the clamp 5, by which the receptacle is held rigidly, but detachably, on said carrier. In the embodiment of this clamp shown by the drawings it consists of a spider 27 and the rods 29, the latter occupying a vertical position and fastened rigidly to the carrier, as shown. The arms of the spider have openings 30, through which may pass the upper threaded ends of the rods 29, so as to receive the nuts 31, which may be screwed down upon the spider to cause the latter to press upon the cage-like receptacle and thus clamp the receptacle between said carrier and the spider. It is evident that drug-receptacles of different sizes may be fitted to and clamped upon the revoluble carrier, according to the quantity of drug material it is desired to place in the machine, and that different receptacles may be used, according to the nature of the drug material, such interchange of the receptacles being easily and quickly effected by simply adjusting the nuts and spider.

After the drug material has been moistened with a suitable menstruum or vehicle and macerated in the usual way it is placed in the cage-like receptacle 4 and around the perforated feed-tube of said receptacle, the drugs being packed in said receptacle so as to lie below the open receiving end of the tube. The receptacle with its contained drug material is placed on the carrier and clamped thereto by the spider, and the cover is now placed on the tank with its funnel in vertical alinement with the vertical feed-tube. The liquid is poured through this funnel into the feed-tube, and the carrier and drug-receptacle are driven at an exceedingly rapid rate to drive or force the fluid out of the drugs by centrifugal force, and as fresh menstruum or liquid is poured into the feed-tube at the center of the mass of drug material such liquid is drawn out by capillary attraction into the drugs and driven through them by centrifugal force. The displaced liquid extract is thrown against the sloping walls of the casing or jacket and it collects in the trough at the bottom of said casing, from which the liquid extract may be conveniently drawn off through the cock.

My invention possesses the following practical advantages: a great saving of time as compared with the old method of percolation by gravity, which requires from two to four days, whereas by my method and apparatus the pharmaceutical properties of the drugs may be completely exhausted or extracted from a suitable quantity of the drug material in from twenty to thirty minutes. It effects a material economy of the alcohol or other liquid used as the menstruum or vehicle, because the displacement through the mass of drug material is accomplished so rapidly that the evaporation is reduced to a minimum and the great force of displacement due to the centrifugal action causes the absorption of the medicinal properties of the drug material with a lower percentage or quantity of alcohol in the menstruum, thus producing a better quality of the fluid extract than can be attained by the percolation method, because of the low percentage of the alcohol. In fact, I have found the same strength of fluid extract from the same quantity of drug material can be secured by my invention by using fifty (50) per centum of alcoholic menstruum, whereas under the percolating method it requires about ninety (90) per centum of alcoholic menstruum. Not only is the fluid extract of greater strength and of purer quality, but the cost of producing the same is materially reduced, which is due to the smaller quantity of menstruum used and the fact that evaporation is reduced to a minimum.

Having thus fully described my invention, what I claim as new, and desire to secure by Letters Patent, is—

1. The combination with a casing, and a shaft, of a carrier provided with upright rods or stems, a foraminous receptacle having an imperforate bottom and adjusted on said carrier within the rods or stems, a clamping-spider resting on the receptacle and fitted to the rods or stems, and devices operating in connection with said rods and the receptacle to clamp the latter upon the carrier, as and for the purposes described.

2. The combination with a casing, and a rotary carrier journaled therein, of a cage-like receptacle provided with a perforated central feed-tube, a spider fitted over the open upper end of the cage-like receptacle and to the upper end of said feed-tube, and means for connecting the spider rigidly to, and to clamp said receptacle on, said carrier, substantially as described, for the purposes set forth.

In testimony whereof I affix my signature in presence of two witnesses.

J. M. THURSTON.

Witnesses:
R. A. JACKSON,
EVERETT R. LEMON.